US008246057B2

(12) United States Patent
Daunais

(10) Patent No.: US 8,246,057 B2
(45) Date of Patent: Aug. 21, 2012

(54) SIDE SUPPORTS FOR STRADDLE-TYPE SEAT

(75) Inventor: Jean Daunais, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/131,683

(22) PCT Filed: Nov. 27, 2009

(86) PCT No.: PCT/US2009/066015
§ 371 (c)(1),
(2), (4) Date: Jun. 10, 2011

(87) PCT Pub. No.: WO2010/063006
PCT Pub. Date: Jun. 3, 2010

(65) Prior Publication Data
US 2011/0284305 A1    Nov. 24, 2011

Related U.S. Application Data

(60) Provisional application No. 61/118,445, filed on Nov. 27, 2008.

(51) Int. Cl.
B60G 17/015    (2006.01)
(52) U.S. Cl. ......... 280/5.5; 180/218; 180/219; 297/201; 297/215.1; 297/215.11; 297/215.12
(58) Field of Classification Search ............... 180/218, 180/219; 280/288.4; 297/195.1, 201, 215.1, 297/215.11, 215.12, 215.15, 284.9
See application file for complete search history.

(56) References Cited

U.S. PATENT DOCUMENTS

| 2,775,950 A | 1/1957 | Dearmond |
| 3,111,042 A | 11/1963 | Hoover |
| 4,225,183 A | 9/1980 | Hanagan et al. |

(Continued)

FOREIGN PATENT DOCUMENTS
WO    2007/090898 A2    8/2007
(Continued)

OTHER PUBLICATIONS

International Search Report from PCT/US2009/066015 mailed on Jan. 29, 2010; Lee W. Young.

Primary Examiner — Toan To
(74) Attorney, Agent, or Firm — Osler, Hoskin & Harcourt LLP

(57) ABSTRACT

A vehicle has a straddle-type seat disposed on a frame. The straddle-type seat has at least one seating portion. A steering device is disposed forwardly of the seat. Left and right side supports are disposed laterally of the seating portion. The side supports have respective support surfaces facing laterally inwardly. The left and right support surfaces move in a direction of a current lateral acceleration of the vehicle in response to a current lateral acceleration of the vehicle. The left and right support surfaces move in a direction of a current rotation of the steering device in response to a current degree of rotation of the steering device. The support surfaces move in a direction of the longitudinal centerline of the vehicle when a force is exerted thereon in a direction opposite a current lateral acceleration of the vehicle. A method of supporting a rider is also described.

25 Claims, 13 Drawing Sheets

U.S. PATENT DOCUMENTS

| | | | |
|---|---|---|---|
| 4,776,632 A | 10/1988 | Akimori et al. | |
| 4,924,163 A | 5/1990 | Sakamoto et al. | |
| 5,707,109 A | 1/1998 | Massara et al. | |
| 5,857,743 A | 1/1999 | Ligon et al. | |
| 6,732,830 B2 * | 5/2004 | Gagnon et al. | 180/291 |
| 6,805,214 B2 * | 10/2004 | Maeda et al. | 180/69.4 |
| 6,857,918 B1 * | 2/2005 | Lebreux et al. | 440/6 |
| 6,968,917 B2 * | 11/2005 | Rondeau et al. | 180/89.1 |
| 7,068,178 B2 | 6/2006 | Oh | |
| 7,121,371 B2 * | 10/2006 | Rondeau et al. | 180/89.1 |
| 7,125,077 B2 | 10/2006 | Frank | |
| 7,523,803 B2 | 4/2009 | Breed | |
| 7,637,338 B2 * | 12/2009 | Maltais et al. | 180/215 |
| 7,647,996 B2 * | 1/2010 | Maltais et al. | 180/89.1 |
| 7,669,686 B1 * | 3/2010 | Einboeck | 180/292 |

FOREIGN PATENT DOCUMENTS

WO 2008/059338 A1 5/2008

* cited by examiner

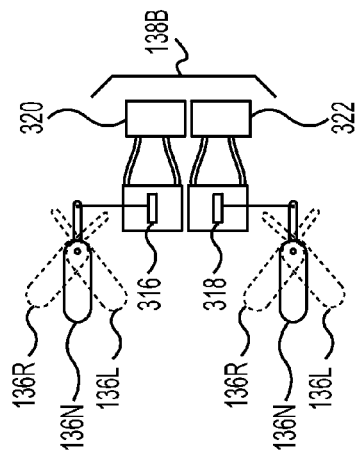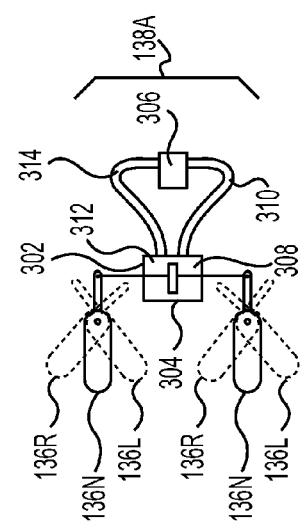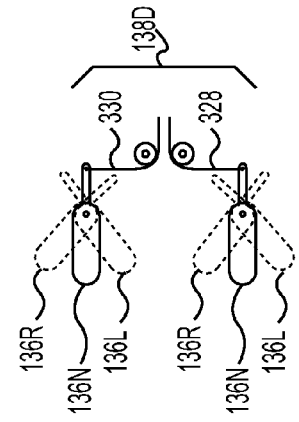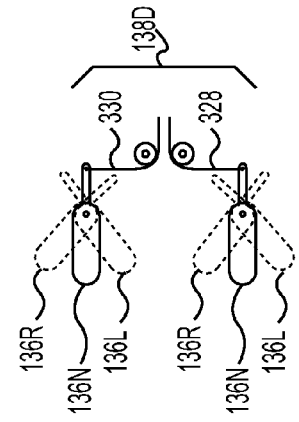

SIDE SUPPORTS FOR STRADDLE-TYPE SEAT

CROSS-REFERENCE

This application claims priority to U.S. Provisional Application No. 61/118,445, filed Nov. 27, 2008, the entirety of which is incorporated herein by reference.

FIELD OF THE INVENTION

The present invention relates to side supports for a straddle-type seat.

BACKGROUND OF THE INVENTION

When a motor vehicle is turning, the driver and passengers of the vehicle experience centrifugal forces due to the lateral acceleration of the vehicle. The sensation experienced by the driver and passengers is a lateral force in the lateral direction opposite the direction in which the vehicle is turning.

A person seated in a car, for example, may attempt to counteract this lateral force by bracing himself against parts of the vehicle during turning, such as the inside of a door or a central console. In addition, car seats generally include structures to provide a certain degree of lateral support.

In a straddle-type vehicle, such as a snowmobile, an ATV or a three-wheeled road vehicle, the straddle-type seat generally provides little or no lateral support to the rider seated thereon, and there are generally no side structures such as doors or consoles against which a rider can brace himself during turning. In addition, the rider may desire to lean into turns, even if the vehicle itself does not lean when turning. A structure providing lateral support on a straddle-type vehicle would obstruct the rider's leaning, thereby reducing his enjoyment from operating the vehicle.

As a result, a rider of a straddle-type vehicle that does not lean when turning must attempt to counterbalance the centrifugal forces by shifting his weight and gripping whatever structures are available to be gripped on the vehicle. This can be tiring for the rider, particularly on long trips and particularly for a passenger who does not have handlebars to grip and can only brace himself by gripping side hand grips provided on the vehicle or holding on to the driver.

Therefore, there is a need for a straddle-type vehicle that provides lateral support for a passenger without interfering with the passenger's enjoyment of riding the vehicle.

SUMMARY OF THE INVENTION

It is an object of the present invention to ameliorate at least some of the inconveniences present in the prior art.

It is also an object of the present invention to provide a straddle-type vehicle that provides lateral support for a passenger during turning of the vehicle while allowing the passenger to lean into turns.

In one aspect, the invention provides a vehicle comprising a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. The left and right support surfaces move generally in a direction of a current lateral acceleration of the vehicle from a first position to a second position when the current lateral acceleration of the vehicle is greater than a first predetermined lateral acceleration. The left and right support surfaces move from the second position toward the first position when the current lateral acceleration of the vehicle is less than a second predetermined lateral acceleration.

In a further aspect, the second predetermined lateral acceleration is approximately equal in magnitude to the first predetermined lateral acceleration.

In a further aspect, the current lateral acceleration of the vehicle is determined based at least in part on at least one of: a current orientation of the steering device; a signal received from at least one lateral acceleration sensor mounted on the vehicle; and a current degree of compression of first and second suspension elements disposed on opposite sides of a longitudinal centerline of the vehicle.

In a further aspect, the at least one seating portion comprises a driver seating portion and at least one passenger seating portion disposed rearwardly of the driver seating portion. The left and right side supports are disposed laterally of the at least one passenger seating portion.

In a further aspect, a lateral separation between the left and right support surfaces is greater than a width of the passenger seating portion.

In a further aspect, a back rest is disposed generally rearwardly of the at least one passenger seating portion. The left and right side supports are connected to the vehicle via the back rest.

In a further aspect, at least one actuator is operative to selectively move the left and right support surfaces between the first and second positions.

In a further aspect, the at least one actuator is disposed at least in part in the back rest.

In a further aspect, the actuator selectively moves the backrest between first and second backrest positions to move the left and right support surfaces between the first and second positions.

In a further aspect, at least one sensor is disposed on the vehicle. A control unit is electrically connected to the at least one sensor. The control unit causes the at least one actuator to move the left and right support surfaces between the first and second positions at least in part in response to a signal received from the at least one sensor indicative of a current lateral acceleration of the vehicle.

In a further aspect, a passenger seat sensor is operative to detect the presence or absence of a passenger on the passenger seating portion. The control unit causes the at least one actuator to move the left and right support surfaces between the first and second positions only when a signal is received from the at least one sensor indicative of a passenger being present on the passenger seating portion.

In a further aspect, left and right driver side supports are disposed laterally outwardly of the at driver seating portion.

In a further aspect, a driver back rest is disposed generally rearwardly of the driver seating portion and generally forwardly of the passenger seating portion. The left and right driver side supports are connected to the vehicle via the driver back rest.

In an additional aspect, the invention provides a method of supporting a passenger on a vehicle. The vehicle has a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. A signal is received indicative of a current lateral acceleration of the vehicle. A current lateral acceleration of the vehicle is compared to a predetermined threshold lateral acceleration. The left and right support surfaces are moved generally in a direction of the current lateral acceleration of the vehicle from a first position to a second position in response to the current lateral acceleration of the vehicle being greater than a first predetermined lateral acceleration. The left and right support surfaces are moved from the second position toward the first position in response to the current lateral acceleration of the vehicle being less than a second predetermined lateral acceleration.

In a further aspect, the second predetermined lateral acceleration is approximately equal in magnitude to the first predetermined lateral acceleration.

In a further aspect, the at least one seating position comprises a driver seating position and a passenger seating position. The left and right side supports are disposed laterally of the passenger seating portion. A signal is received indicative of a passenger being seated on the passenger seating position.

In an additional aspect, the invention provides a vehicle comprising a frame. An engine supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. The left support surface moves generally in a direction of a longitudinal centerline of the vehicle when a force is exerted on the left support surface generally in a direction generally opposite a current lateral acceleration of the vehicle. The right support surface moves generally in a direction of a longitudinal centerline of the vehicle when a force is exerted on the right support surface generally in a direction generally opposite the current lateral acceleration of the vehicle.

In an additional aspect, the invention provides a vehicle comprising a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed laterally outwardly of the at least one seating portion, the left and right side supports having respective left and right support surfaces facing generally laterally inwardly. The left and right support surfaces move generally in a first lateral direction from a first position toward a second position when the steering device is rotated in the first lateral direction. The left and right support surfaces move from the second position toward the first position when the steering device is rotated in a second lateral direction opposite the first lateral direction.

In a further aspect, a mechanical linkage operatively connects the steering device to the left and right side supports. A rotation of the steering device in the first lateral direction actuates the left and right support surfaces via the mechanical linkage to move the left and right support surfaces in the first lateral direction.

In a further aspect, the mechanical linkage includes at least one cable.

In a further aspect, the at least one cable is at least one push-pull cable.

In a further aspect, the steering device is connected to the left and right support surfaces via at least one hydraulic actuator. A rotation of the steering device in the first lateral direction actuates the left and right support surfaces via the hydraulic actuator to move the left and right support surfaces in the first lateral direction. A rotation of the steering device in the second lateral direction actuates the left and right support surfaces via the hydraulic actuator to move the left and right support surfaces toward the first position.

In an additional aspect, the invention provides a vehicle comprising a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. The left support surface moves generally to the right, and the right support surface is maintained in position, when the vehicle is steered to the right. The right support surface moves generally to the left, and the left support surface is maintained in position, when the vehicle is steered to the left.

In an additional aspect, the invention provides a method of supporting a passenger on a vehicle. The vehicle has a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. A signal is received indicative of a current degree of rotation of the steering device in a first direction. A current degree of rotation of the steering device is compared to a predetermined degree of rotation of the steering device. The left and right support surfaces are moved generally in the first direction in response to the current degree of rotation of the steering device being greater than a first predetermined degree of rotation of the steering device. The left and right support surfaces are moved from the second position toward the first position in response to the current degree of rotation of the steering device being less than a second predetermined degree of rotation of the steering device.

In an additional aspect, the invention provides a method of supporting a passenger on a vehicle. The vehicle has a frame. An engine is supported on the frame. At least one propulsion device is operatively connected to the engine to propel the vehicle. A straddle-type seat is disposed on the frame. The straddle-type seat has at least one seating portion. A steering device is disposed generally forwardly of the seat. Left and right side supports are disposed generally laterally of the at least one seating portion on opposite sides of a longitudinal centerline of the vehicle. The left and right side supports have respective left and right support surfaces facing generally laterally inwardly. The left support surface is moved generally to the right, and the right support surface is maintained in position, in response to a current lateral acceleration of the vehicle to the right being greater than a predetermined lateral acceleration. The right support surface is moved generally to the left, and the left support surface is maintained in position, in response to a current lateral acceleration of the vehicle to the left being greater than the predetermined lateral acceleration.

For purposes of this application, directional terms such as "forwardly", "rearwardly", "right" and "left" are defined with respect to a forward direction of travel of the vehicle, and should be understood as they would be understood by a rider sitting on the vehicle in a normal riding position. The term "lateral acceleration", in reference to a vehicle, refers to the direction in which the vehicle is accelerating with respect to the ground; for example, if the vehicle is turning right, the lateral acceleration of the vehicle refers to an acceleration to the right, in the direction toward the center of the turn.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 3A-3H are schematic views of the side supports of FIG. 2 having different actuators;

DETAILED DESCRIPTION OF THE PREFERRED EMBODIMENTS

Figure 1:
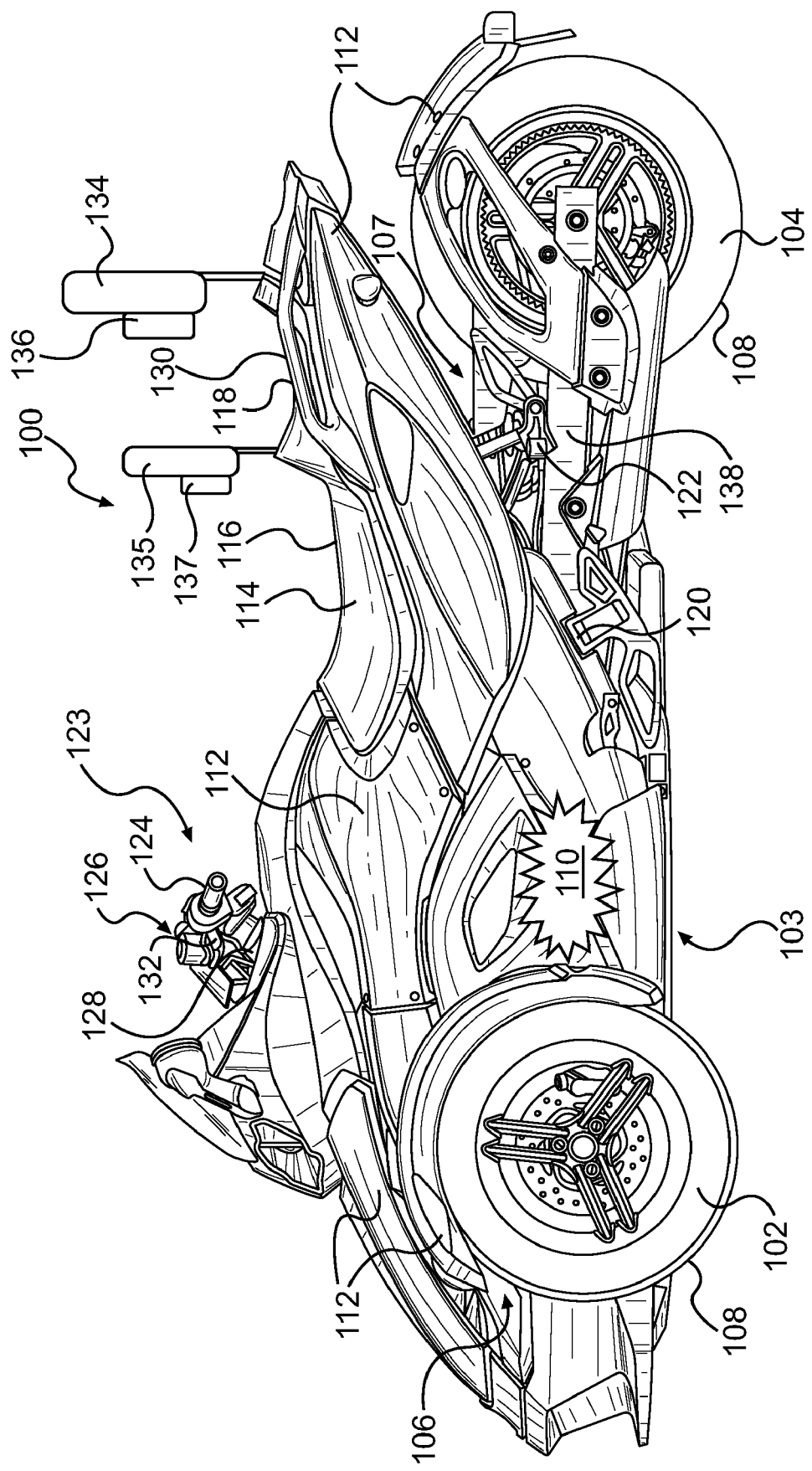
FIG. 1 is a left side elevation view of a three-wheeled road vehicle having driver and passenger back rests and side supports according to the invention.

Referring to FIG. 1, a three-wheeled road vehicle 100 will be described to which the present invention is applied. It should be understood that the present invention is also applicable to other straddle-type vehicles such as snowmobiles and ATVs.

The vehicle 100 has two laterally spaced front wheels 102 and a single rear wheel 104. The front wheels 102 are mounted on the frame 103, via a front suspension assembly 106. The rear wheel 104 is mounted on the frame 103 via a rear suspension assembly 107. Each of the front wheels 102 and the rear wheel 104 has mounted thereon a tire 108 suitable for road use. It is contemplated that the rear wheel 104 may have two or more tires 108 disposed next to each other mounted thereon and still be considered a single wheel. The front and rear wheels 102, 104 are each provided with a brake (not shown). The rear wheel 104 is powered by an engine 110 (schematically illustrated) via a transmission (not shown) to propel the vehicle 100. The vehicle frame supports a body composed of a number of fairings 112 which provide aesthetic appeal and protect the rider from dirt and water that may be lifted by the tires 108 while the vehicle is in use.

A straddle-type seat 114 mounted on the frame provides a first seating position 116 for a driver, and a second seating position 118 for a passenger. The vehicle 100 may alternatively have only a single seating position 116 for the driver. A pair of grab handles 130 is provided to be gripped by the passenger. A pair of driver foot pegs 120 and a pair of passenger foot pegs 122 are provided below the seat 114 for the driver and passenger, respectively, to rest their feet thereon. A back rest 134 for the passenger is provided rearwardly of the second seating position 118. A pair of side supports 136 for the passenger are movably attached to the back rest 134. The back rest 134 and the side supports 136 will be discussed below in further detail. It is contemplated that the vehicle 100 may alternatively not have a back rest 134, in which case the side supports 136 would be mounted directly to the vehicle 100. A back rest 135 for the driver is provided rearwardly of the first seating position 116 and forwardly of the second seating position 118. A pair of side supports 137 for the driver are movably attached to the back rest 135. It should be understood that the back rest 135 and side supports 137 operate in substantially the same manner as the back rest 134 and side supports 136. As such, the back rest 135 and side supports 137 will not be described separately in detail.

A steering assembly 123 is provided generally forward of the seat 114. The steering assembly 123 has a left handlebar 124 and a right handlebar 126 that can be gripped by a rider. The handlebars 124, 126 are connected to a steering column 128. The steering assembly 123 is connected to the front wheels 102 in a known manner, such that turning the handlebars 124, 126 turns the wheels 102 to steer the vehicle 100. A brake actuator, in the form of a hand brake lever 132, is provided near the left handlebar 124 for braking the vehicle 100.

Figure 2:
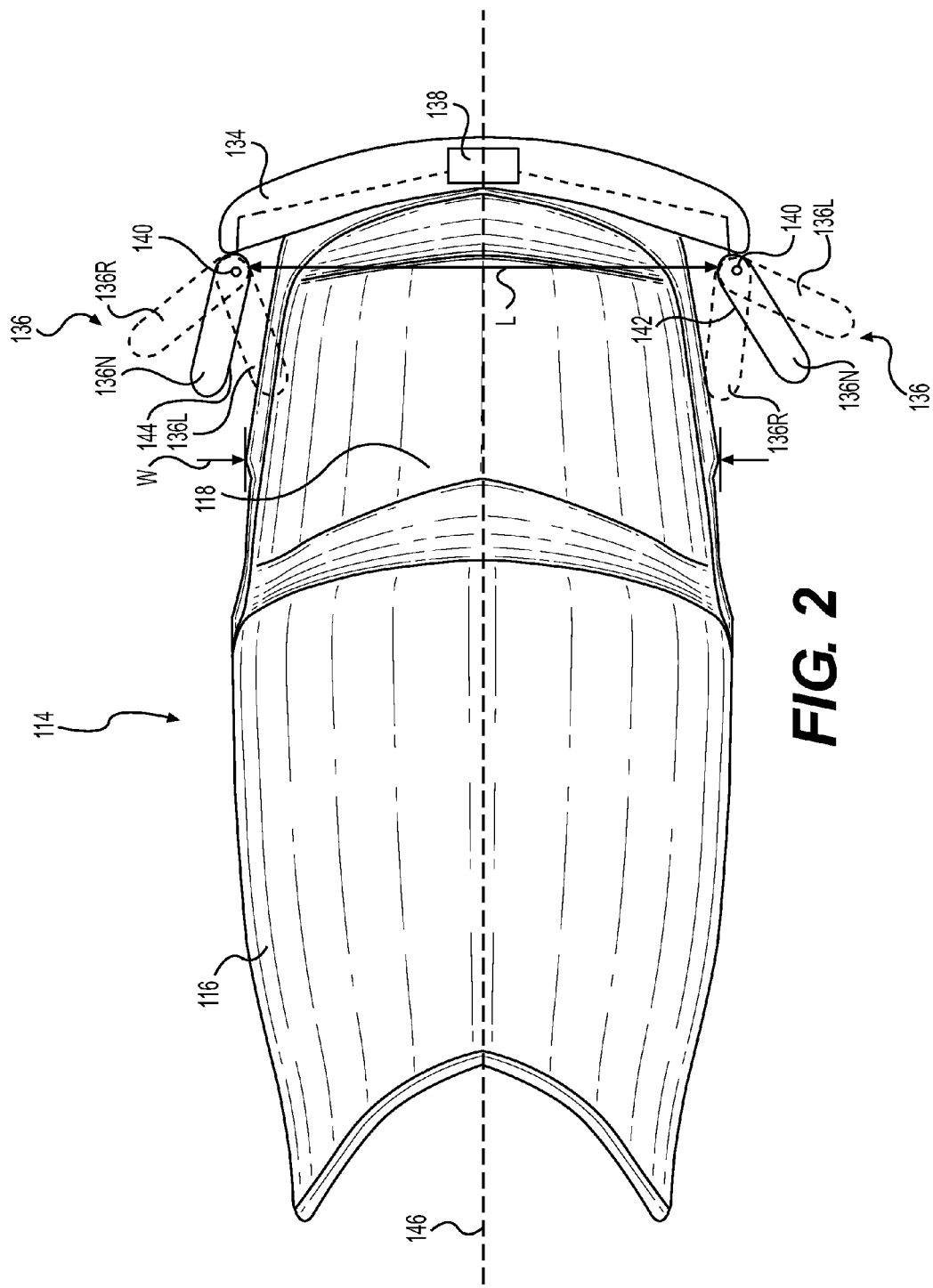
FIG. 2 is a top plan view of a straddle-type seat having a passenger back rest and side supports according to an embodiment of the invention.

Referring to FIG. 2, the back rest 134 and the side supports 136 will be described according to a first embodiment.

The back rest 134 extends vertically upwardly from a rearward portion of the top of the vehicle 100, generally rearwardly of the second seating position 118 of the seat 114. The back rest 134 is generally dimensioned to support at least a lower portion of the back of a passenger seated on the second seating position 118. The side supports 136 extend forwardly from the left and right sides of the back rest 134, respectively on left and right sides of the second seating position 118. A left support surface 142 on the left side support 136 and a right support surface 144 on the right side support 136 generally face toward the longitudinal centerline 146 of the vehicle 100, and provide support for the passenger in a direction toward the longitudinal centerline 146 when the passenger comes into contact with the side supports 136 while seated on the second seating portion 118. The left and right support surfaces 142, 144 are spaced apart by a lateral separation L that is greater than the width W of the second seating portion 118, because the straddle-type seat 114 is usually designed to be narrower than the body of the passenger to allow the passenger to comfortably straddle the seat 114. If the seat 114 has only the seating position 116 for the driver, the back rest 134 would be disposed rearwardly of the seating position 116 and the side supports 136 would extend on left and right sides of the seating position 116. The left and right side supports 136 are each pivotable with respect to the back rest 134 about respective generally vertical axes 140 between a normal position 136N, a left position 136L and a right position 136R. It is contemplated that the axes 140 may alternatively be in different positions on the side supports 136, such as inside the back rest 134 to provide an aesthetically pleasing arrangement. The movement of the left and right side supports 136 is controlled by an actuator 138, which is mechanically coupled to the side supports 136. The actuator 138 is preferably disposed inside the back rest 134 to provide a compact and aesthetically pleasing arrangement, but other locations are contemplated. The actuator 138 will be discussed below in further detail. It is contemplated that the side supports 136 may be biased toward the normal position 136N, such that the actuator 138 would only be required to displace the side supports 136 toward the respective positions 136L or 136R, and the side supports would be returned to the normal position 136N by the biasing force once the actuator 138 ceases to act thereon. It is further contemplated that the side supports 136 could have only a normal position 136N and a second position laterally inwardly of the normal position 136N, i.e. a left position 136L of the right side support 136 and a right position 136R of the left side support 136.

Referring to FIGS. 3A-3H, the actuator 138 will be described according to a number of embodiments. It should be understood that any other suitable type of actuator may alternatively be used.

Referring to FIG. 3A, the actuator 138A is a single pneumatic or hydraulic actuator. A chamber 302 houses a piston 304 that is mechanically coupled to the side supports 136. A pump and valve assembly 306 can selectively supply high-pressure fluid to the left side 308 of the chamber 302 via the tube 310, displacing the piston 304 to the right and causing the side supports 136 to move to the left positions 136L. The pump and valve assembly 306 can also supply high-pressure fluid to the right side 312 of the chamber 302 via the tube 314, displacing the piston 304 to the left and causing the side supports 136 to move to the right position 136R. The pump and valve assembly 306 can also cause the side supports 136 to return to the normal position 136N in a known manner, for example by moving the piston 304 toward a middle position with the aid of a position sensor (not shown). It is contemplated that the side supports 136 may alternatively be returned to the normal positions 136N by a biasing force, such as a spring (not shown). The operation of the pump and valve assembly 306 is controlled by the control unit 502 (FIG. 5), as will be described below in further detail.

Referring to FIG. 3B, the actuator 138B is a dual pneumatic or hydraulic actuator. Each side support 136 is coupled to a separate piston 316, 318 which is driven by a respective pump and valve assembly 320, 322 of the actuator 138B. The operation of the actuator 138B is similar to the operation of actuator 138A, with the exception that the actuator 138B allows each side support 136 to be moved to the left or right independently of the other side support 136. The pump and valve assemblies 320, 322 are controlled by the control unit 502 (FIG. 5), as will be described below in further detail. It is contemplated that a single pump and valve assembly could alternatively be used to drive both pistons 316, 318, in which case the left and right side supports 136 may not be able to be moved independently of each other.

Referring to FIG. 3C, the actuator 138C is a rack and pinion actuator. The rack 324 of the actuator 138C is coupled to the side supports 136. The rotation of the pinion 326 causes linear motion of the rack 324 to either the left or right, depending on the direction of rotation of the pinion 326. Movement of the rack 324 to the left causes the side supports 136 to move from the normal position 136N toward the right position 136R, and movement of the rack 324 to the right causes the side supports 136 to move toward the left position 136L. The rotation of the pinion 326 may be caused by an electric motor, which is controlled by the control unit 502 (FIG. 5), as will be described below in further detail.

Referring to FIG. 3D, the actuator 138D is a mechanical linkage in the form of a left push-pull cable 328 coupled to the left side support 136 and a right push-pull cable 330 coupled to the right side support 136. The cables 328, 330 may be coupled to portions of the steering assembly 123 of the vehicle 100, such that steering the vehicle 100 to the left or right actuates one or both of the cables 328, 330, as will be described below in further detail. It is contemplated that a single push-pull cable or left and right pull cables may alternatively be used, for example if the left and right side supports 136 are connected by a linkage. It is further contemplated that the cables 328, 330 may alternatively be ordinary pull cables arranged such that tension in one of the cables 328, 330 moves the corresponding side support 136 toward the longitudinal centerline 146 of the vehicle. In this case, the side supports 136 would be biased toward the normal position 136N so as to return to the normal position 136N when the tension in the cables 328, 330 is released. It is further contemplated that the cables 328, 330 may alternatively be coupled to individual actuators (not shown) that are controlled by the control unit 502 (FIG. 5) for selectively actuating one or the other of the cables 328, 330, as will be described below in further detail.

Figure 3F:
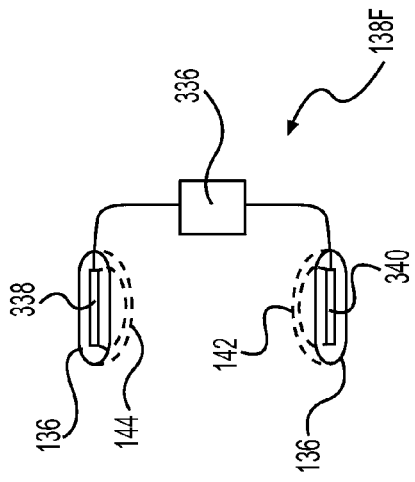
Figure 3H:
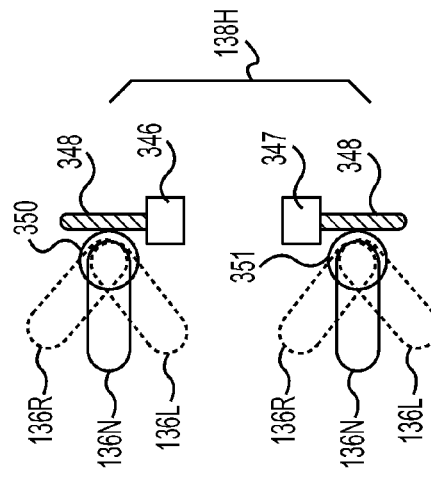
Figure 3E:
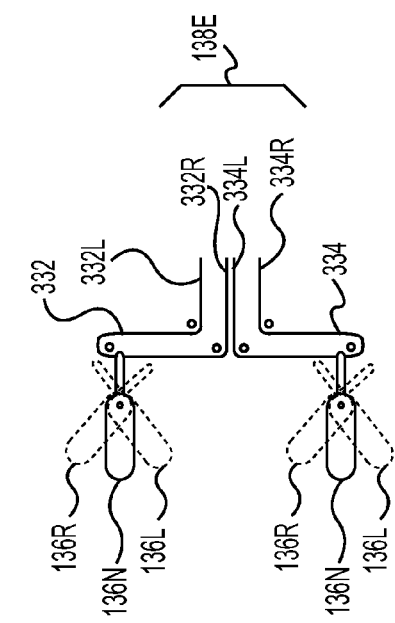

Referring to FIG. 3E, the actuator 138E is an alternative arrangement of a mechanical linkage. The cable 332 is coupled to the right side support 136 and has ends 332L and 332R. When the end 332L of the cable 332 is tensioned, the right side support 136 is moved to the left position 136L. When the end 332R of the cable 332 is tensioned, the right side support 136 is moved to the right position 136R. The cable 334 is coupled to the left side support 136 and has ends 334L and 334R. When the end 334L of the cable 334 is tensioned, the left side support 136 is moved to the left position 136L. When the end 334R of the cable 334 is tensioned, the left side support 136 is moved to the right position 136R. The cables 332, 334 may be coupled to the steering assembly 123 of the vehicle 100, such that steering the vehicle 100 to the left or right actuates a corresponding one of the cables 332, 334 to move the side supports 136, as will be described below in further detail. It is contemplated that the ends 332L, 332R, 334L, 334R of the cables 332, 334 may alternatively be coupled to individual actuators (not shown) that are controlled by the control unit 502 (FIG. 5) for selectively actuating one or the other of the cables 332, 334, as will be described below in further detail.

Referring to FIG. 3F, the actuator 138F includes a compressor 336 capable of supplying pressurized air to balloon-like chambers 338, 340 disposed respectively in the right and left side supports 136. When the compressor 336 supplies air to the chamber 338, the chamber 338 expands and urges the support surface 144 toward the longitudinal centerline 146 of the vehicle. When the compressor 336 supplies air to the chamber 340, the chamber 340 expands and urges the support surface 142 toward the longitudinal centerline 146 of the vehicle. An outlet (not shown) is provided in each chamber 338, 340 so that the support surfaces 142, 144 can return to their normal positions when the compressor 336 is no longer supplying air to the corresponding chamber 338, 340. The outlet may include a valve selectively open to the atmosphere. The outlet may alternatively communicate with the compressor 336, such that the compressor 336 can remove air from the chambers 338, 340. It is contemplated that the normal position may alternatively correspond to an intermediate state in which the chambers 338, 340 are partially inflated, in which case the chambers 338, 340 could be further inflated to move the corresponding support surfaces toward the longitudinal centerline 146 of the vehicle 100, or further deflated to move the corresponding support surfaces away from the longitudinal centerline 146. It is further contemplated that the support surfaces 142, 144 could instead be moved using mechanical actuators disposed in the side supports 136. The compressor 336 is controlled by the control unit 502, as will be described below in further detail.

Figure 3G:
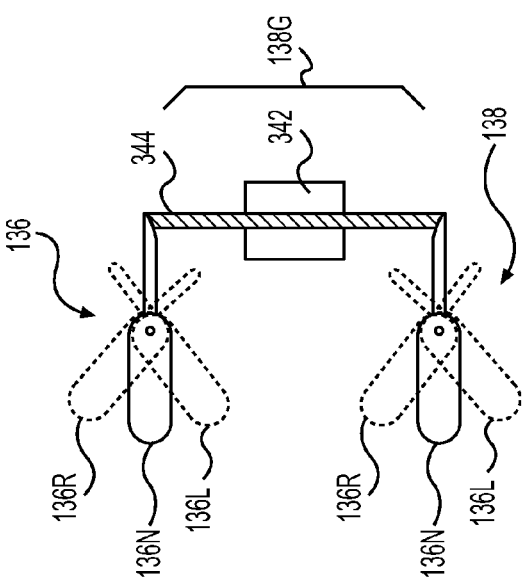

Referring to FIG. 3G, the actuator 138G includes a motor 342 coupled to a threaded shaft 344. The threaded shaft 344 is coupled at one end to the left side support 136 and at the other end to the right side support 136. The rotation of the motor 342 causes linear motion of the threaded shaft 344 to either the left or right, depending on the direction of rotation of the motor 342. Movement of the threaded shaft 344 to the left causes the side supports 136 to move from the normal position 136N toward the right position 136R, and movement of the threaded shaft 344 to the right causes the side supports 136 to move toward the left position 136L. The motor 342 may be an electric motor, which is controlled by the control unit 502 (FIG. 5), as will be described below in further detail.

Referring to FIG. 3H, the actuator 138H includes left and right motors 346, 347 coupled to respective left and right worms 348, 349. The worms 348, 349 mesh with respective left and right worm gears 350, 351 that are respectively coupled to the left and right side supports 136. The rotation of the motors 346, 347 causes the side supports 136 to move from the normal position 136N toward either the left position 136L or the right position 136R, depending on the direction of rotation of the motors 346, 347. The motors 346, 347 may be electric motors, which are controlled by the control unit 502 (FIG. 5), as will be described below in further detail.

Figure 4:
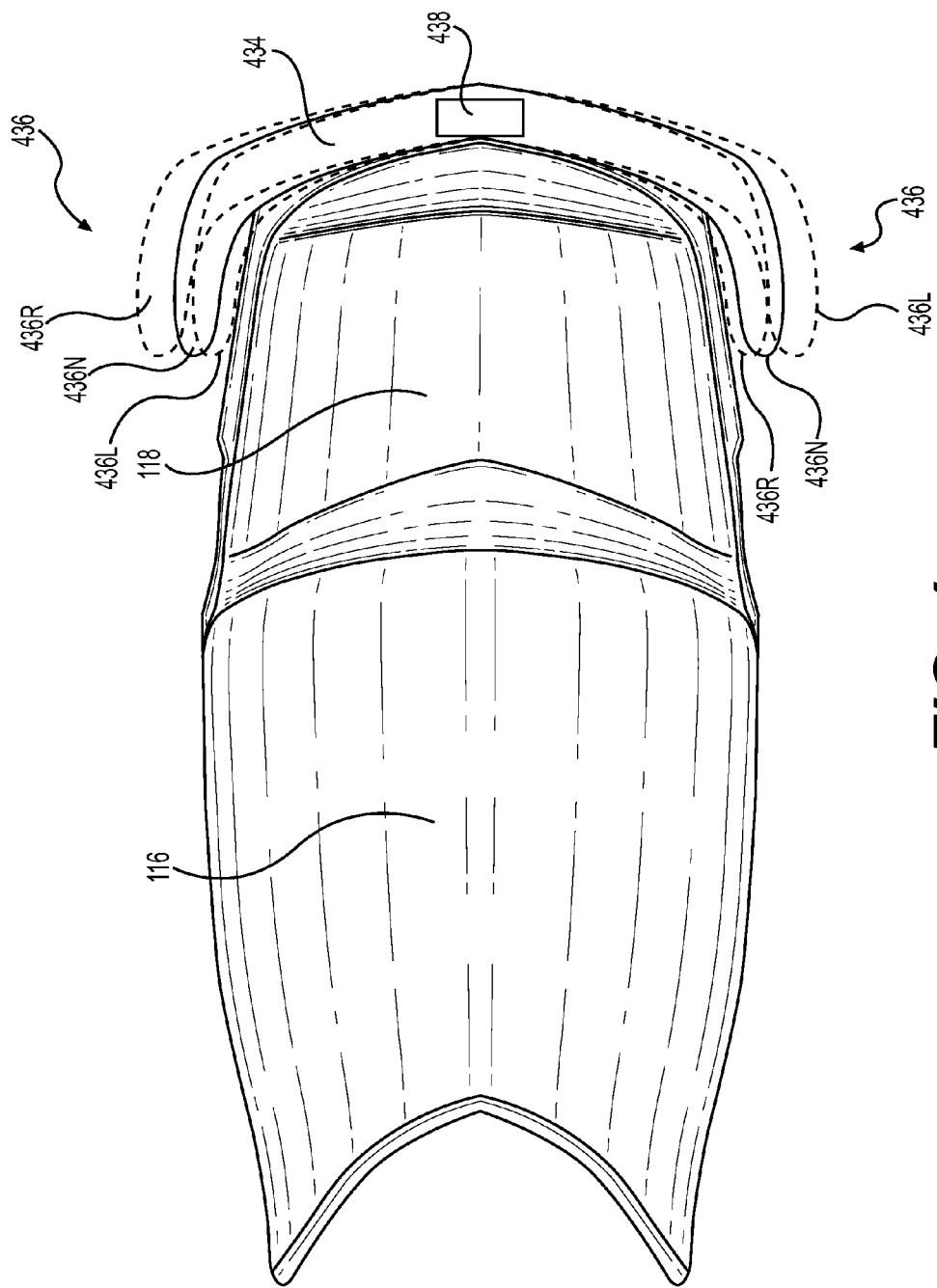
FIG. 4 is a top plan view of a straddle-type seat having a passenger back rest and side supports according to an alternative embodiment of the invention.

Referring to FIG. 4, the back rest 134 and the side supports 136 will be described according to a second embodiment. The side supports 436 do not move relative to the back rest 434. The actuator 438 is capable of moving the back rest 434 laterally to the left or right relative to the body of the vehicle 100. The actuator 438 may be similar to any of the actuators 138A-138H in FIGS. 3A-3H, or may be any other suitable actuator. Depending on the type of actuator 438 used, the lateral movement of the back rest 434 may be a translational movement, a pivotal movement about a pivot axis (not shown) near the base of the back rest 434, or a combination of the two. When the back rest 434 is moved to the left, the side supports 436 are in the position 436L. When the back rest 434 is moved to the right, the side supports 436 are in the position 436R. The back rest 434 is preferably biased to a center position, such that when the actuator 438 does not act on the back rest 434, the side supports are in the position 436N. It is contemplated that the back rest 434 may be biased toward the position in which the side supports 436 are in the position 436N. The actuator 438 is controlled by the control unit 502 (FIG. 5) in the same way as the actuator 138, as will be described below in further detail.

Figure 5:
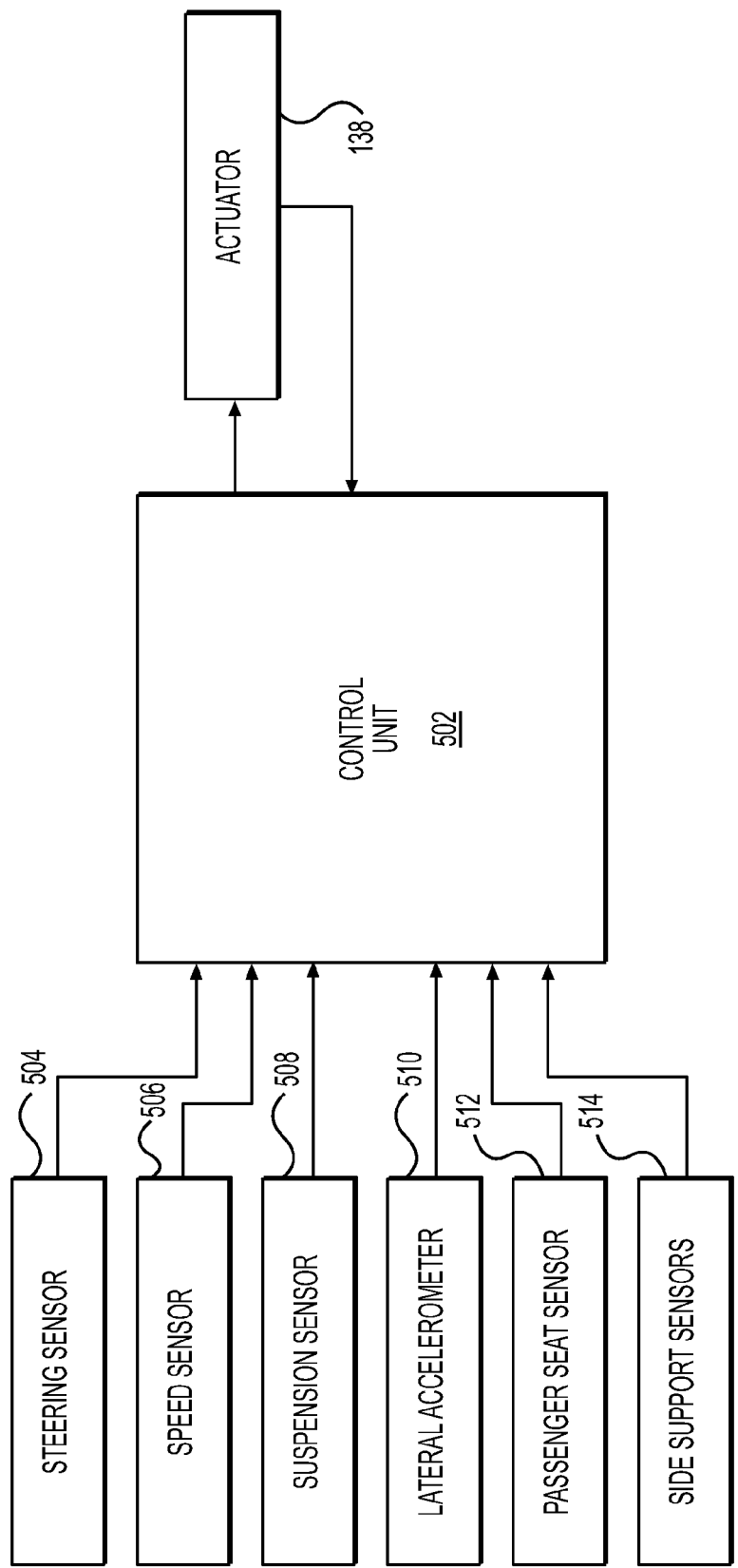
FIG. 5 is a block diagram of a control unit and associated elements in accordance with the invention.

Referring to FIG. 5, the control unit 502 and associated elements will be described.

The control unit 502 receives inputs from one or more sensors located on the vehicle 100. A steering sensor 504 sends a signal to the control unit 502 indicative of the current degree of rotation of the steering assembly 123, which can be determined by sensing the position of any portion of the steering assembly 123 or of the front wheels 102. A speed sensor 506 sends a signal to the control unit 502 indicative of the current speed of the vehicle 100. A suspension sensor 508 sends a signal to the control unit 502 indicative of the current tension and/or compression of the left and right sides of the front suspension assembly 106. A lateral accelerometer 510 sends a signal to the control unit 502 indicative of the current lateral acceleration of the vehicle 100. A passenger seat sensor 512 sends a signal to the control unit 502 indicative of whether a passenger is currently seated on the second seating position 118. Side support sensors 514 send a signal to the control unit 502 indicative of whether a laterally outward force is being exerted on one or the other of the side supports 136 by the passenger. These sensors may be any type of sensor known in the art that is suitable for their respective purposes. It is contemplated that a particular vehicle 100 may have only some of these sensors, and that additional sensors may optionally be provided.

The control unit 502 sends signals to the actuator 138 to control the operation of the actuator 138 based on at least one signal received from at least one of the sensors described above, and thereby control the position of the side supports 136. The control unit 502 may also receive a feedback signal from either the actuator 138 or the side supports 136 indicative of the current position of the side supports 136.

Figure 6:
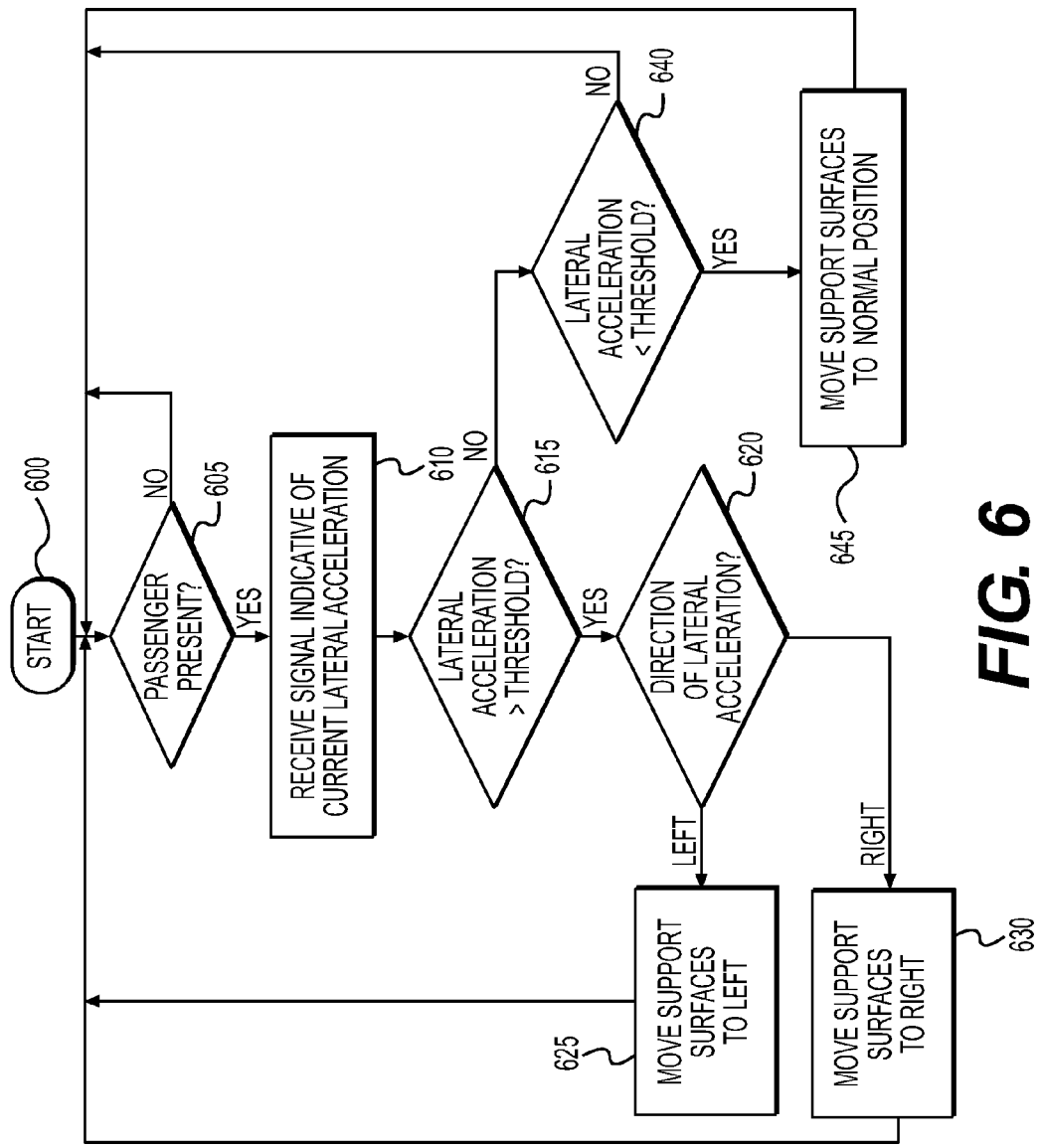
FIGS. 6-9 are logic diagrams of the actuation of side supports according to various embodiments of the invention.

Referring to FIG. 6, the operation of the control unit 502 to control the side supports 136 will be described according to a first embodiment, starting at step 600 with the side supports initially in the normal position 136N.

At step 605, the control unit 502 detects whether a passenger is present on the second seating position 118, based on a signal received from the passenger seat sensor 512. If a signal, or absence of signal, received from the passenger seat sensor 512 indicates that no passenger is present on the second seating position 118, the process returns to step 605 because the side supports 136 do not need to be controlled in the absence of a passenger. If the signal received from the passenger seat sensor 512 indicates that a passenger is present on the second seating position 118, the process continues at step 610. It is contemplated that this step may be omitted, for example if the vehicle 100 does not have a passenger seat sensor 512, or if the side supports 136 are positioned to provide lateral support for the driver seated in the first seating position 116, in which case the process would go directly from step 600 to step 610.

At step 610, the control unit 502 receives a signal indicative of a current lateral acceleration of the vehicle. The signal received may be any information that allows the current lateral acceleration of the vehicle to be determined by the control unit 502, either alone or when combined with other information. For example, the signal could be the output of the lateral accelerometer 510, which can be directly interpreted as the current lateral acceleration. The signal could alternatively be the output of the suspension sensor 508, which can be used to determine the current lateral acceleration either via calculations or using a map stored in the control unit 502. The signal could alternatively be the output of both the steering sensor 504 and the speed sensor 506, which can be used together by the control unit 502 to calculate the current lateral (centripetal) acceleration based on the instantaneous speed and turning radius of the vehicle 100. The process continues at step 615.

At step 615, the control unit 502 compares the current lateral acceleration to a predetermined threshold lateral acceleration. If the current lateral acceleration is less than the threshold lateral acceleration, the process continues at step 640. If the current lateral acceleration is greater than the threshold lateral acceleration, the process continues at step 620. It is contemplated that the threshold lateral acceleration could be zero.

At step 620, the direction of the current lateral acceleration is determined. It is contemplated that this determination may alternatively be performed concurrently with step 610. If the current lateral acceleration is to the left, corresponding to the vehicle turning to the left, the process continues at step 625. If the current lateral acceleration is to the right, corresponding to the vehicle turning to the right, the process continues at step 630.

At step 625, the control unit 502 sends a signal to the actuator 138 to cause the support surfaces 142, 144 on both sides of the passenger to move to the left. In the case of the actuators 138A-138E and 438, this is accomplished by moving the side supports 136 toward the position 136L. Moving the support surface 144 to the left, toward the rider, provides additional support for the passenger against the centrifugal force toward the right side that he experiences during a left turn. Moving the support surface 142 to the left, away from the rider, prevents the support surface 142 from obstructing the passenger's movement should the passenger choose to lean to his left, into the left turn. It is contemplated that the degree of movement of the side supports 136 may increase with increasing lateral acceleration, thereby providing increased support when the passenger experiences a greater lateral force. The control unit returns to step 605 and awaits a subsequent signal indicative of a current lateral acceleration.

At step 630, the control unit 502 sends a signal to the actuator 138 to cause the support surfaces 142, 144 on both sides of the passenger to move to the right. In the case of the actuators 138A-138E and 438, this is accomplished by moving the side supports 136 toward the position 136R. Moving the support surface 142 to the right, toward the rider, provides additional support for the passenger against the centrifugal force toward the left side that he experiences during a right turn. Moving the support surface 144 to the right, away from the rider, prevents the support surface 142 from obstructing the passenger's movement should the passenger choose to lean to his right, into the right turn. It is contemplated that the degree of movement of the side supports 136 may increase with increasing lateral acceleration, thereby providing increased support when the passenger experiences a greater lateral force. The control unit returns to step 605 and awaits a subsequent signal indicative of a current lateral acceleration.

At step 640, the control unit 502 compares the current lateral acceleration to a predetermined threshold lateral acceleration. The predetermined threshold acceleration may or may not be the same as the threshold acceleration at step 615. If the current lateral acceleration is greater than the threshold lateral acceleration, the control unit 502 returns to step 605 and awaits a subsequent signal indicative of a current lateral acceleration. It is presumed that a high lateral acceleration indicates that the vehicle is still turning, and the passenger would continue to require the additional lateral support obtained by moving the side supports 136 at step 625 or 630. If the current lateral acceleration is less than the threshold lateral acceleration, it is presumed that the passenger no longer requires the additional lateral support, and the process continues at step 645. It is contemplated that the threshold lateral acceleration could be zero.

At step 645, the control unit 502 causes the support surfaces 142, 144 on both sides of the passenger to return toward the normal position. The control unit 502 may do this by sending a signal to the actuator 138 to move the side supports 136 toward the position 136N. If the side supports 136 are biased toward the position 136N, the control unit 502 may alternatively do this by sending a signal to the actuator 138 to stop urging the support surfaces 142, 144 in the direction determined at step 620, or by discontinuing the signal sent to the actuator 138 at step 625 or 630. In this case, the actuator 138 ceases to act on the support surfaces 142, 144 and the biasing force returns the support surfaces 142, 144 toward the normal position. It is contemplated that this step may be omitted if the support surfaces 142, 144 are already in the normal position. The control unit 502 then returns to step 605 and awaits a subsequent signal indicative of a current lateral acceleration.

Figure 7:
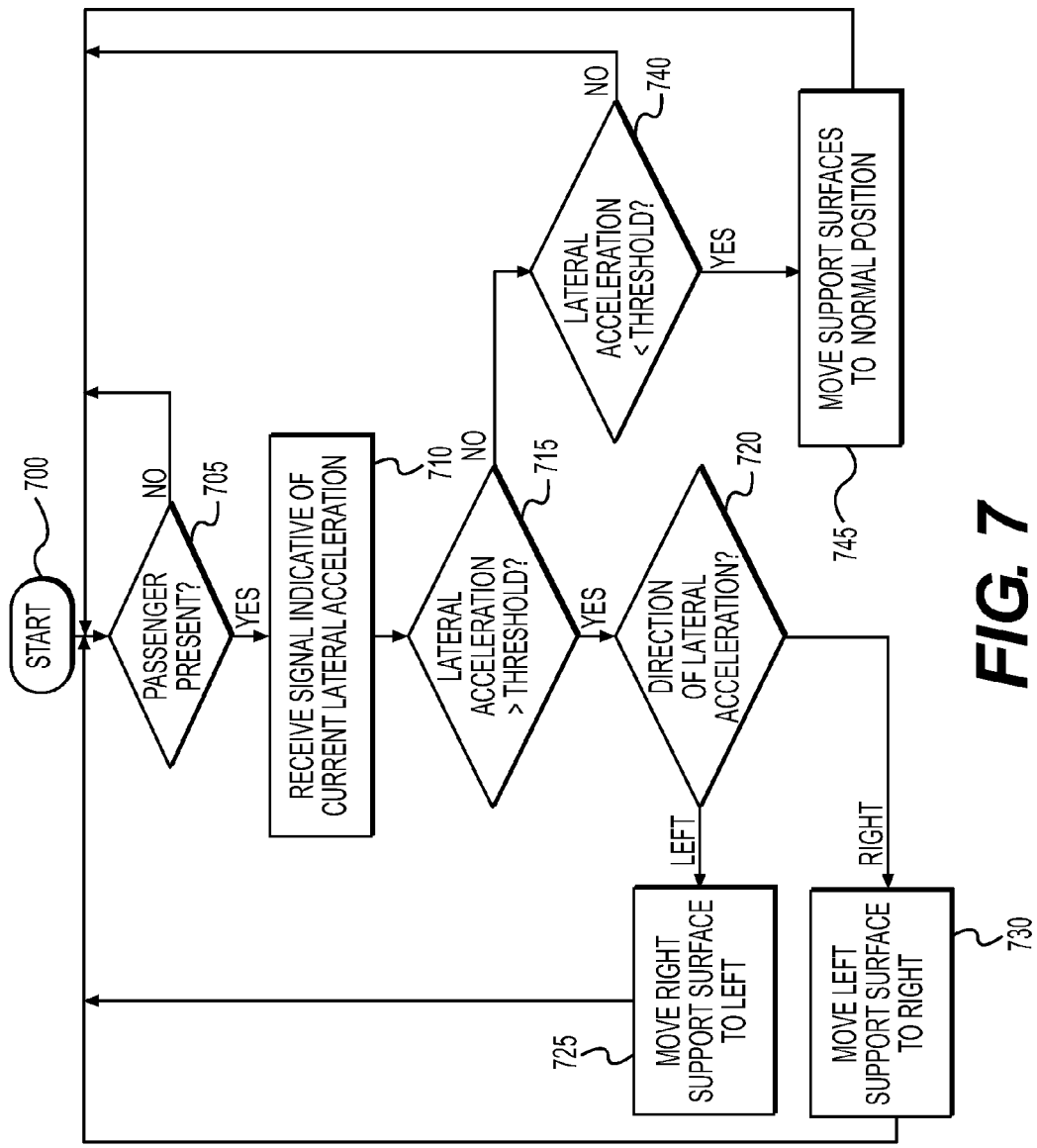

Referring to FIG. 7, the operation of the control unit 502 to control the side supports 136 will be described according to a second embodiment, starting at step 700 with the side supports initially in the normal position 136N.

Steps 705, 710, 715 and 720 are similar to steps 605, 610, 615 and 620 respectively, and as such will not be described in detail.

At step 725, if the current lateral acceleration is to the left, corresponding to the vehicle turning to the left, the control unit 502 sends a signal to the actuator 138 to cause the right support surface 144 on the right side of the passenger to move to the left. The control unit 502 does not send a signal to the actuator 138 to cause the left support surface 142 to move, and as a result the left support surface 142 remains in the normal position. It should be understood that this step requires an actuator 138 that is capable of moving the support surfaces 142, 144 independently of each other, and that some of the actuators 138A-138H of FIGS. 3A-3H, as well as the actuator 438 of FIG. 4, may not be suitable for this embodiment. Moving the support surface 144 to the left, toward the rider, provides additional support for the passenger against the centrifugal force toward the right side that he experiences during a left turn. It is contemplated that the degree of movement of the side supports 136 may increase with increasing lateral acceleration, thereby providing increased support when the passenger experiences a greater lateral force. The control unit returns to step 705 and awaits a subsequent signal indicative of a current lateral acceleration.

At step 730, if the lateral acceleration is to the right, corresponding to the vehicle turning to the right, the control unit 502 sends a signal to the actuator 138 to cause the support surface 142 on the left side of the passenger to move to the right. The control unit 502 does not send a signal to the actuator 138 to cause the right support surface 142 to move, and as a result the right support surface 142 remains in the normal position. It should be understood that this step requires an actuator 138 that is capable of moving the support surfaces 142, 144 independently of each other, and that some of the actuators 138A-138F of FIGS. 3A-3H, as well as the actuator 438 of FIG. 4, may not be suitable for this embodiment. Moving the support surface 142 to the right, toward the rider, provides additional support for the passenger against the centrifugal force toward the left side that he experiences during a right turn. It is contemplated that the degree of movement of the side supports 136 may increase with increasing lateral acceleration, thereby providing increased support when the passenger experiences a greater lateral force. The control unit returns to step 705 and awaits a subsequent signal indicative of a current lateral acceleration.

Steps 740 and 745 are similar to steps 640 and 645 respectively, and as such will not be described in detail.

Figure 8:
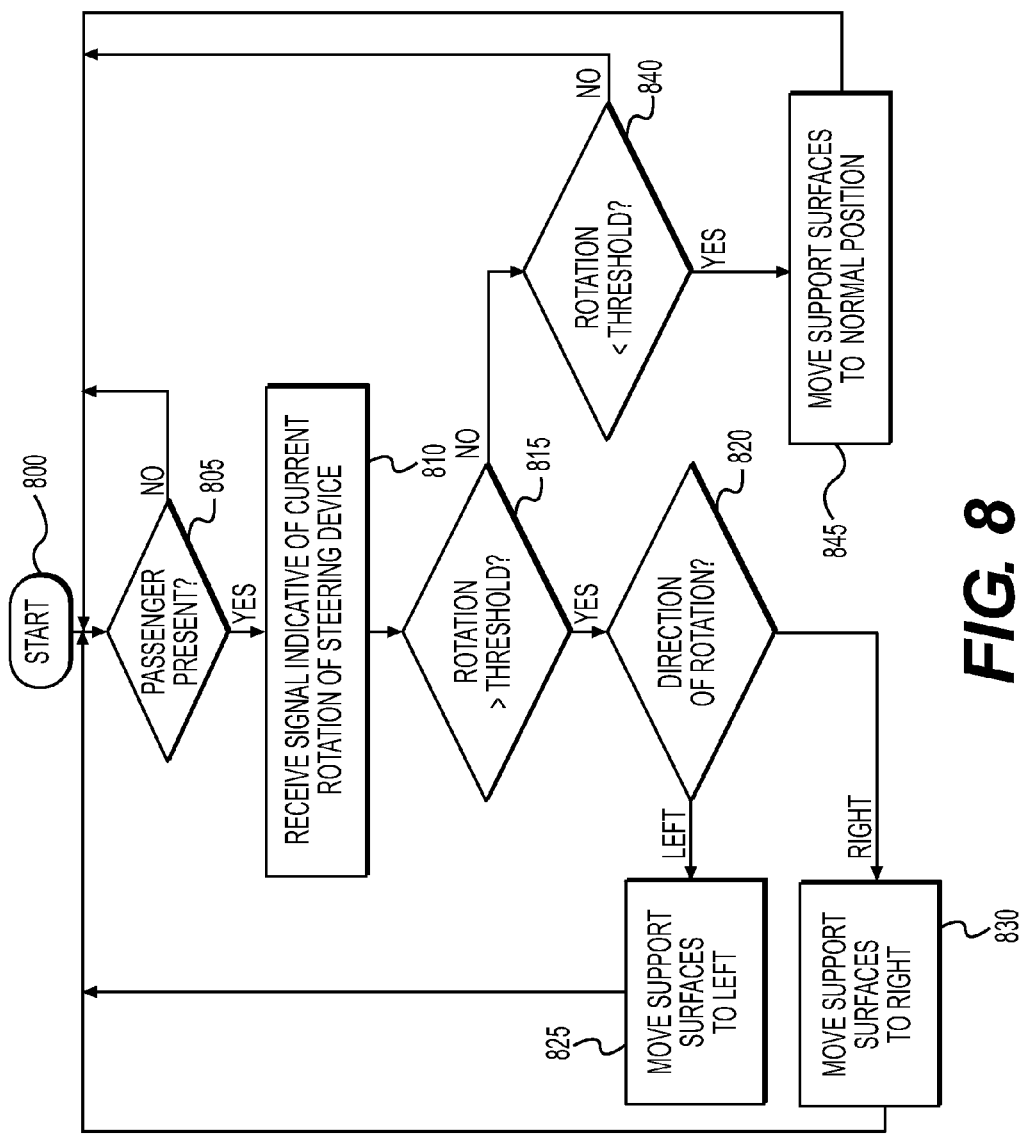

Referring to FIG. 8, the operation of the control unit 502 to control the side supports 136 will be described according to a third embodiment, starting at step 800 with the side supports initially in the normal position 136N.

Step 805 is similar to step 605, and as such will not be described in detail.

At step 810, the control unit 502 receives a signal indicative of a current degree of rotation of the steering device 123 of the vehicle 100. The signal received may be any information that allows the current degree of rotation of the steering device 123 of the vehicle 100 to be determined by the control unit 502, either alone or when combined with other information. For example, the signal could be the output of the steering sensor 504, which can be directly interpreted as the current degree of rotation of the steering device 123. The signal could alternatively be the output of both the lateral accelerometer 510 and the speed sensor 506, which can be used together by the control unit 502 to calculate the current turning radius, and therefore the current degree of rotation of the steering device, based on the instantaneous lateral (centripetal) acceleration and the instantaneous speed of the vehicle 100. The process continues at step 815.

At step 815, the control unit 502 compares the current degree of rotation of the steering device to a predetermined threshold degree of rotation of the steering device. If the current degree of rotation of the steering device is less than the threshold degree of rotation of the steering device, the process continues at step 840.

If the current degree of rotation of the steering device is greater than the threshold degree of rotation of the steering device, the process continues at step 820. It is further contemplated that the threshold degree of rotation of the steering device may be a variable threshold, either stored in the control unit 502 as a mathematical relationship or based on a control map. For example, the threshold degree of rotation of the steering device may be lower at higher vehicle speeds, because at high speeds even a gentle turn might necessitate some additional lateral support for the passenger. It is further contemplated that the threshold degree of rotation of the steering device could be zero.

At step 820, the direction of the current rotation of the steering device is determined. It is contemplated that this determination may alternatively be performed concurrently with step 810. If the current lateral acceleration is to the left, corresponding to the vehicle turning to the left, the process continues at step 825. If the current lateral acceleration is to the right, corresponding to the vehicle turning to the right, the process continues at step 830.

At step 825, the control unit 502 sends a signal to the actuator 138 to cause the support surfaces 142, 144 on both sides of the passenger to move to the left. This step is similar to step 625, and as such will not be described in further detail.

At step 830, the control unit 502 sends a signal to the actuator 138 to cause the support surfaces 142, 144 on both sides of the passenger to move to the right. This step is similar to step 630, and as such will not be described in further detail.

At step 840, the control unit 502 compares the current degree of rotation of the steering device to a predetermined threshold degree of rotation of the steering device. The predetermined threshold degree of rotation of the steering device may or may not be the same as the threshold degree of rotation of the steering device at step 815. If the current degree of rotation of the steering device is greater than the threshold degree of rotation of the steering device, the control unit 502 returns to step 805 and awaits a subsequent signal indicative of a current degree of rotation of the steering device. It is presumed that a high degree of rotation of the steering device indicates that the vehicle is still turning, and the passenger would continue to require the additional lateral support obtained by moving the side supports 136 at step 825 or 830. If the current degree of rotation of the steering device is less than the threshold degree of rotation of the steering device, it is presumed that the passenger no longer requires the additional lateral support, and the process continues at step 845. It is contemplated that the threshold degree of rotation of the steering device could be zero.

Step 845 is similar to step 645, and as such will not be described in detail.

Figure 9:
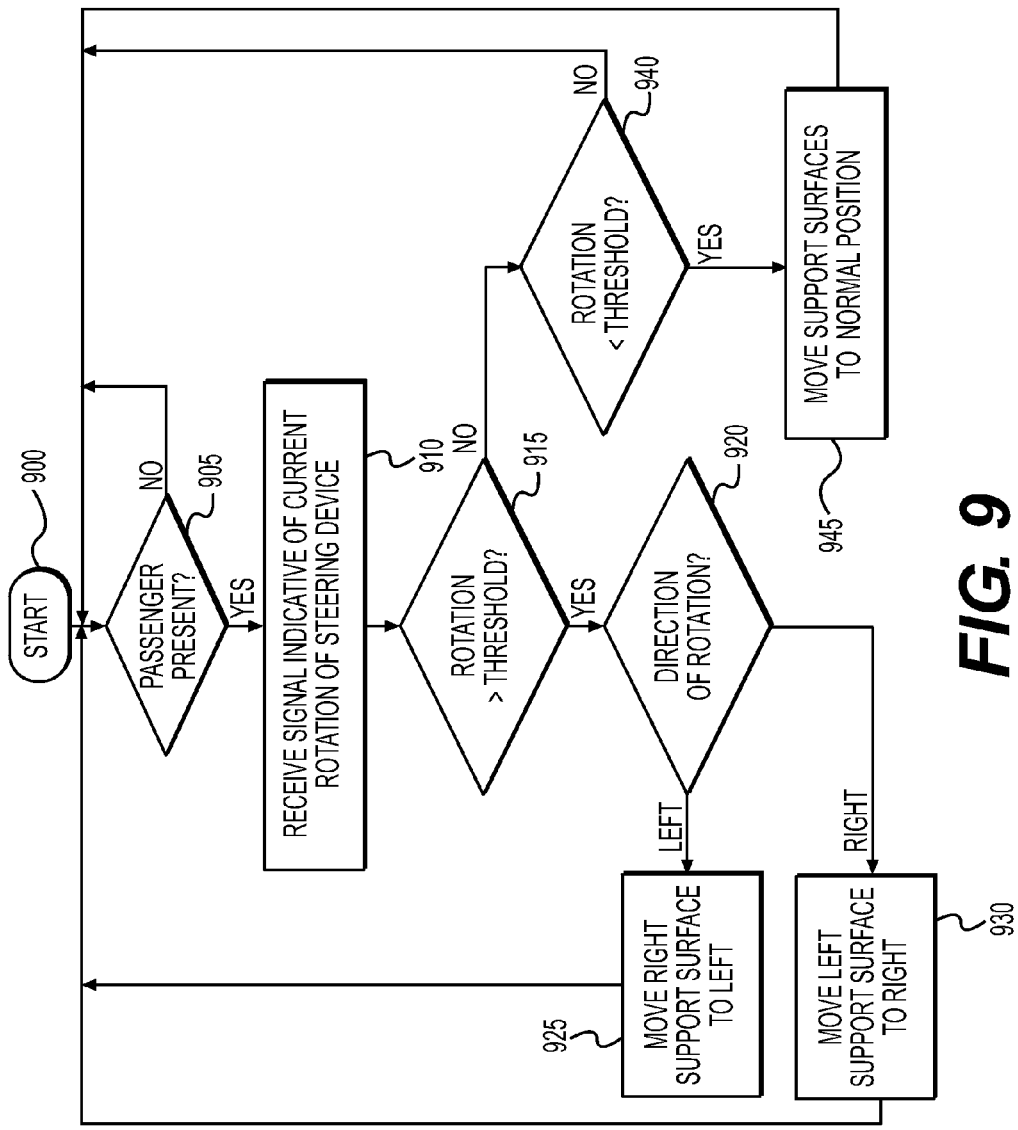

Referring to FIG. 9, the operation of the control unit 502 to control the side supports 136 will be described according to a fourth embodiment, starting at step 900 with the side supports initially in the normal position 136N.

Steps 905, 910, 915 and 920 are similar to steps 805, 810, 815 and 820 respectively, and as such will not be described in detail.

At step 925, if the current rotation of the steering device is to the left, corresponding to the vehicle turning to the left, the control unit 502 sends a signal to the actuator 138 to cause the right support surface 144 on the right side of the passenger to move to the left, toward the rider. The control unit 502 does not send a signal to the actuator 138 to cause the left support surface 142 to move, and as a result the left support surface 142 remains in the normal position. It is contemplated that the degree of movement of the side supports 136 may increase with increasing rotation of the steering device 123, thereby providing increased support when the passenger experiences a greater lateral force. This step is similar to step 725, and as such will not be described in further detail.

At step 930, if the current rotation of the steering device is to the right, corresponding to the vehicle turning to the right, the control unit 502 sends a signal to the actuator 138 to cause the support surface 142 on the left side of the passenger to move to the right, toward the rider. The control unit 502 does not send a signal to the actuator 138 to cause the right support surface 142 to move, and as a result the right support surface 142 remains in the normal position. It is contemplated that the degree of movement of the side supports 136 may increase with increasing rotation of the steering device 123, thereby providing increased support when the passenger experiences a greater lateral force. This step is similar to step 730, and as such will not be described in further detail.

Steps 940 and 945 are similar to steps 640 and 645 respectively, and as such will not be described in detail.

Figure 10:
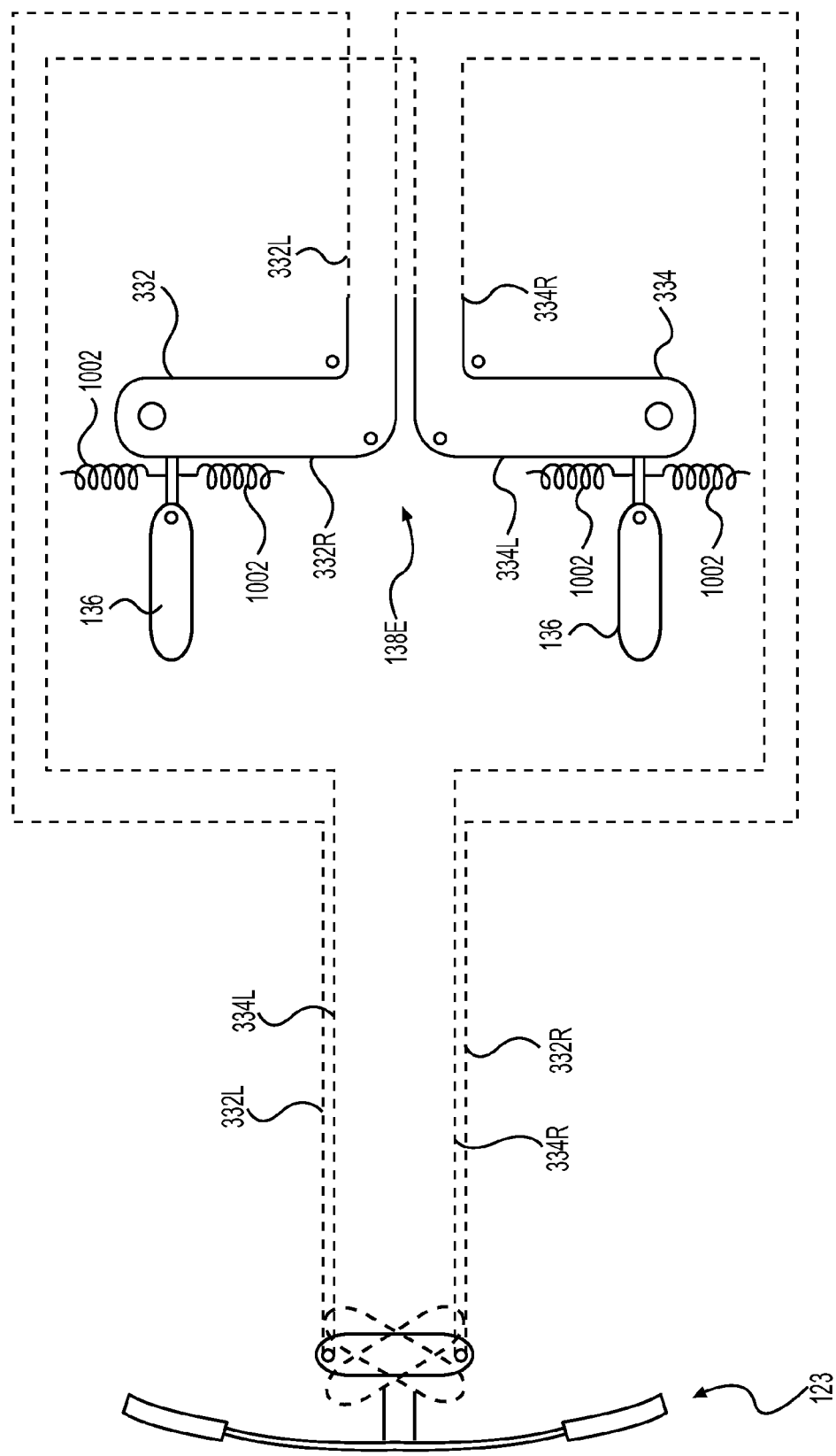
FIG. 10 is a schematic view of side supports actuated by a steering device according to an alternative embodiment of the invention.

Referring to FIG. 10, the operation of the side supports 136 will be described according to a fifth embodiment, using the actuator 138E of FIG. 3E by way of example.

The steering assembly 123 (shown schematically) is connected to the actuator 138E via a mechanical linkage in the form of the cables 332, 334. When the steering assembly 123 is turned to the right, corresponding to the vehicle 100 being steered to the right, the tension in the ends 332R, 334R of the respective cables 332, 334 is increased. As a result, the side supports are moved to the right position 136R. When the steering assembly 123 is returned to the normal position, corresponding to the vehicle 100 being steered straight, the left and right side supports 336 return to the normal position 136N due to the resulting decrease in the tension in the ends 332R, 334R and increase in the tension in the ends 332L, 334L. When the steering assembly 123 is turned to the left, corresponding to the vehicle 100 being steered to the left, the tension in the ends 332L, 334L of the respective cables 332, 334 is increased. As a result, the side supports are moved to the left position 136L. When the steering assembly 123 is returned to the normal position, the left and right side supports 336 return to the normal position 136N due to the resulting decrease in the tension in the ends 332L, 334L and increase in the tension in the ends 332R, 334R. It is contemplated that a different actuator may be used, such as the actuator 138D of FIG. 3D, in which case it is possible for only one of the two sides supports 136 to move when the steering assembly 123 is turned, similarly to the embodiment of FIG. 9.

Figure 11:
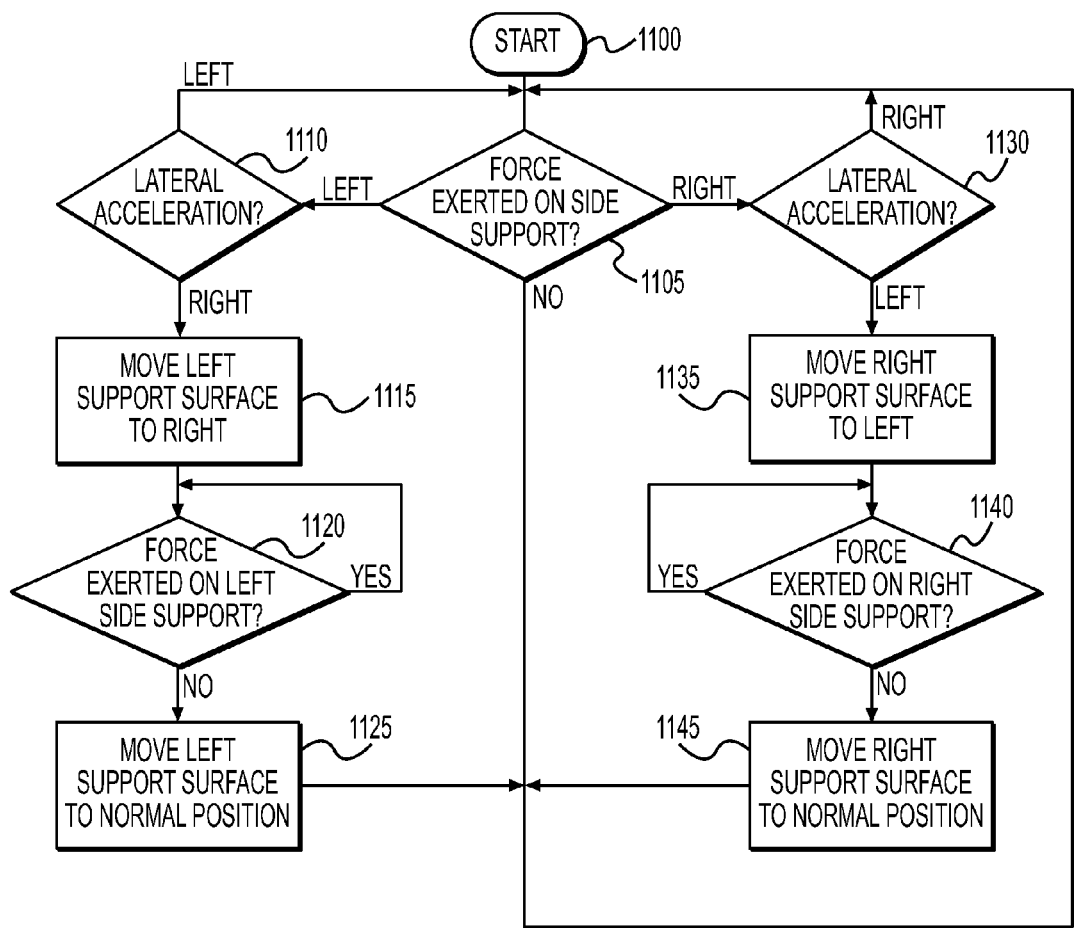
FIGS. 11 and 12 are logic diagrams of the actuation of side supports according to alternative embodiments of the invention.

Referring to FIG. 11, the operation of the control unit 502 to control the side supports 136 will be described according to a sixth embodiment, beginning at step 1100 with the side supports initially in the normal position 136N.

At step 1105, the control unit 502 determines whether a laterally outward force is being exerted by the passenger on either the left or right side support 136, based on a signal received from the side support sensors 514. The control unit 502 also determines which side support 136 is subjected to the force. The magnitude of the force is preferably compared to a predetermined threshold force, either by an operation of the control unit 502 or by configuring the side support sensors 514 to not respond to forces below the threshold. The threshold could be calibrated to prevent the control unit 502 from responding to a rider casually bumping or leaning against the side supports 136. It is contemplated that the threshold could alternatively be calibrated based on an average level of force exerted on the side supports 136 over a predetermined interval, in which case the control unit 502 would effectively be responding to a recent change in the force exerted on the side supports 136, for example if the passenger is using the side supports 136 as armrests and exerting a continuous force thereon. If a laterally outward force exceeding the threshold is exerted on the left side support 136, the process continues at step 1110. If a laterally outward force exceeding the threshold is exerted on the right side support 136, the process continues at step 1135. If no laterally outward force exceeding the threshold is exerted on either side support 136, the process returns to step 1105 and the control unit 502 awaits another signal from the side support sensors 514.

At step 1110, the control unit 502 receives a signal indicative of a current lateral acceleration of the vehicle. The signal received may be any information that allows the current lateral acceleration of the vehicle to be determined by the control unit 502, either alone or when combined with other information. For example, the signal could be the output of the lateral accelerometer 510, which can be directly interpreted as the current lateral acceleration. The signal could alternatively be the output of the suspension sensor 508, which can be used to determine the current lateral acceleration either via calculations or using a map stored in the control unit 502. The signal could alternatively be the output of both the steering sensor 504 and the speed sensor 506, which can be used together by the control unit 502 to calculate the current lateral (centripetal) acceleration based on the instantaneous speed and turning radius of the vehicle 100. It is contemplated that the control unit 502 may alternatively receive a signal indicative only of the direction of the current lateral acceleration of the vehicle, in which case the output of the steering sensor 504 alone would be sufficient. It is contemplated that this determination may alternatively take place before step 1105. If the direction of the current lateral acceleration is to the right, corresponding to the vehicle being turned to the right, it is presumed that the force exerted by the passenger on the left side support 136 is indicative of the passenger's need for additional support from the left side support 136, and the process continues at step 1115. If the direction of the current lateral acceleration is to the left, it is presumed that the rider is leaning into the left turn of the vehicle and does not require additional support from the left side support 136, and the process returns to step 1105 and the control unit 502 awaits another signal from the side support sensors 514. The magnitude of the current lateral acceleration may also be considered, in which case the process may return to step 1105 irrespective of the direction of the current lateral acceleration if the magnitude of the lateral acceleration is below a predetermined threshold. It is contemplated that this step may be omitted, in which case the process may go from step 1105 directly to step 1115.

At step 1115, the control unit 502 sends a signal to the actuator 138 to cause the support surface 142 on the left side of the passenger to move to the right. The control unit 502 may optionally also send a signal to the actuator 138 to cause the right support surface 144 to move to the right, or allow the right support surface 144 to remain in the normal position. Moving the left support surface 142 to the right, toward the rider, provides additional support for the passenger against the centrifugal force toward the left side that he experiences during a right turn. The process continues at step 1120.

At step 1120, the control unit 502 detects whether a laterally outward force is still being exerted on the left side support 136, based on a signal received from the side support sensors 514. The magnitude of the force is preferably compared to a predetermined threshold force, which may or may not be the same as the threshold force at step 1105. If a laterally outward force is no longer being exerted on the left side support 136, or if the force is lower than the predetermined threshold, the process continues at step 1125. If a laterally outward force greater than the threshold is still being exerted on the left side support 136, it is presumed that the vehicle is still turning, and the process returns to step 1120 and the control unit 502 awaits another signal from the side support sensors 514.

At step 1125, the control unit 502 causes the left support surface 142 to return to the normal position. The control unit 502 may do this by sending a signal to the actuator 138 to move the left side support 136 to the position 136N. If the side supports 136 are biased toward the position 136N, the control unit 502 may alternatively do this by sending a signal to the actuator 138 to stop urging the support surface 142 to the right, or by discontinuing the signal sent to the actuator 138 at step 1115. In this case, the actuator 138 ceases to act on the support surface 142 and the biasing force returns the support surface 142 to the normal position. The control unit 502 then returns to step 1105 and awaits a subsequent signal indicative of a current laterally force being exerted on the side supports 136.

At step 1130, the control unit 502 receives a signal indicative of a current lateral acceleration of the vehicle. If the direction of the current lateral acceleration is to the left, corresponding to the vehicle being turned to the left, it is presumed that the force exerted by the passenger on the right side support 136 is indicative of the passenger's need for additional support from the right side support 136, and the process continues at step 1135. If the direction of the current lateral acceleration is to the right, it is presumed that the rider is leaning into the right turn of the vehicle and does not require additional support from the right side support 136, and the process returns to step 1105 and the control unit 502 awaits another signal from the side support sensors 514. The magnitude of the current lateral acceleration may also be considered, in which case the process may return to step 1105 irrespective of the direction of the current lateral acceleration if the magnitude of the lateral acceleration is below a predetermined threshold. It is contemplated that this step may be omitted, in which case the process may go from step 1105 directly to step 1135.

At step 1135, the control unit 502 sends a signal to the actuator 138 to cause the support surface 144 on the right side of the passenger to move to the left. The control unit 502 may optionally also send a signal to the actuator 138 to cause the left support surface 142 to move to the left, or allow the left support surface 142 to remain in the normal position. Moving the right support surface 144 to the left, toward the rider, provides additional support for the passenger against the centrifugal force toward the right side that he experiences during a left turn. The process continues at step 1140.

At step 1140, the control unit 502 detects whether a laterally outward force is still being exerted on the right side support 136, based on a signal received from the side support sensors 514. The magnitude of the force is preferably compared to a predetermined threshold force, which may or may not be the same as the threshold force at step 1105. If a laterally outward force is no longer being exerted on the right side support 136, or if the force is lower than the predetermined threshold, the process continues at step 1145. If a laterally outward force greater than the threshold is still being exerted on the right side support 136, it is presumed that the vehicle is still turning, and the process returns to step 1140 and the control unit 502 awaits another signal from the side support sensors 514.

At step 1145, the control unit 502 causes the support surface 144 to return to the normal position. The control unit 502 may do this by sending a signal to the actuator 138 to move the right side support 136 to the position 136N. If the side supports 136 are biased toward the position 136N, the control unit 502 may alternatively do this by sending a signal to the actuator 138 to stop urging the support surface 144 to the left, or by discontinuing the signal sent to the actuator 138 at step 1135. In this case, the actuator 138 ceases to act on the support surface 144 and the biasing force returns the support surface 144 to the normal position. The control unit 502 then returns to step 1105 and awaits a subsequent signal indicative of a current laterally force being exerted on the side supports 136.

Figure 12:
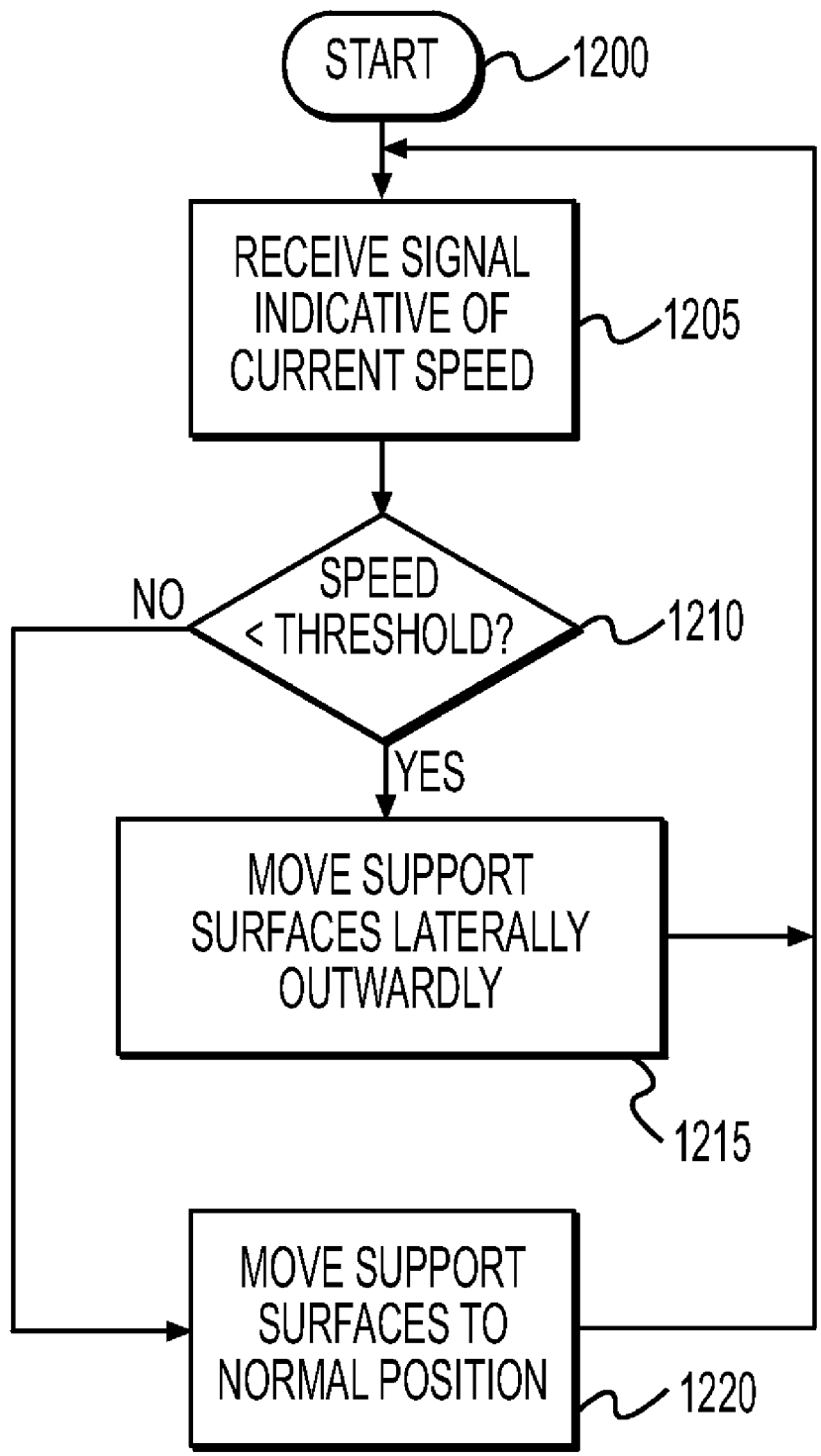

Referring to FIG. 12, the operation of the control unit 502 to control the side supports 136 will be described according to a seventh embodiment, beginning at step 1200 with the side supports initially in the normal position 136N.

At step 1205, the control unit 502 receives a signal indicative of a current speed of the vehicle 100. The signal received may be any information that allows the current speed of the vehicle to be determined by the control unit 502, either alone or when combined with other information. For example, the control unit could receive a signal from the speed sensor 506. The process continues at step 1210.

At step 1210, the control unit 502 compares the current speed to a predetermined threshold speed. If the current speed is less than the threshold speed, the control unit proceeds to step 1215. If the current speed is greater than the threshold speed, the control unit proceeds to step 1220. It is contemplated that the threshold speed could be zero, in which case comparing the current speed to the threshold speed corresponds to determining whether the vehicle is currently stopped or moving.

At step 1215, the control unit 502 sends a signal to the actuator 138 to cause the support surfaces 142, 144 on both sides of the passenger to move laterally outwardly. In the case of the actuators 138A-138E and 438, this is accomplished by moving the left side support 136 to the position 136L and moving the right side support to the position 136R. Moving the support surfaces 142, 144 laterally outwardly prevents the support surfaces 142, 144 from interfering with the passenger as he gets on or off the second seating position 118. The process continues at step 1205.

At step 1220, the control unit 502 sends a signal to the actuator 138 to cause the support surfaces 142, 144 on both sides of the passenger to move to the normal position. In the case of the actuators 138A-138E and 438, this is accomplished by moving the left and right side supports 136 to the positions 136N. Moving the support surfaces 142, 144 to the normal position provides increased comfort and lateral support to the passenger while the vehicle 100 is moving. The process continues at step 1205.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
a frame;
an engine supported on the frame;
at least one propulsion device operatively connected to the engine to propel the vehicle;
a straddle-type seat disposed on the frame, the straddle-type seat having at least one seating portion;
a steering device disposed generally forwardly of the seat; and
left and right side supports disposed generally laterally of the at least one seating portion on opposite sides of a longitudinal centerline of the vehicle, the left and right side supports having respective left and right support surfaces facing generally laterally inwardly,
the left and right support surfaces moving generally in a direction of a current lateral acceleration of the vehicle from a first position to a second position when the current lateral acceleration of the vehicle is greater than a first predetermined lateral acceleration, and
the left and right support surfaces moving from the second position toward the first position when the current lateral acceleration of the vehicle is less than a second predetermined lateral acceleration.

2. The vehicle of claim 1, wherein the second predetermined lateral acceleration is approximately equal in magnitude to the first predetermined lateral acceleration.

3. The vehicle of claim 1, wherein the current lateral acceleration of the vehicle is determined based at least in part on at least one of:
a current orientation of the steering device;
a signal received from at least one lateral acceleration sensor mounted on the vehicle; and
a current degree of compression of first and second suspension elements disposed on opposite sides of a longitudinal centerline of the vehicle.

4. The vehicle of claim 1, wherein:
the at least one seating portion comprises a driver seating portion and at least one passenger seating portion disposed rearwardly of the driver seating portion; and
the left and right side supports are disposed laterally of the at least one passenger seating portion.

5. The vehicle of claim 4, wherein a lateral separation between the left and right support surfaces is greater than a width of the passenger seating portion.

6. The vehicle of claim 4, further comprising a back rest disposed generally rearwardly of the at least one passenger seating portion, wherein the left and right side supports are connected to the vehicle via the back rest.

7. The vehicle of claim 6, further comprising at least one actuator operative to selectively move the left and right support surfaces between the first and second positions.

8. The vehicle of claim 7, wherein the at least one actuator is disposed at least in part in the back rest.

9. The vehicle of claim 7, wherein the actuator selectively moves the backrest between first and second backrest positions to move the left and right support surfaces between the first and second positions.

10. The vehicle of claim 7, further comprising:
at least one sensor disposed on the vehicle; and
a control unit electrically connected to the at least one sensor,
wherein the control unit causes the at least one actuator to move the left and right support surfaces between the first and second positions at least in part in response to a signal received from the at least one sensor indicative of a current lateral acceleration of the vehicle.

11. The vehicle of claim 10, further comprising a passenger seat sensor operative to detect the presence or absence of a passenger on the passenger seating portion;
wherein the control unit causes the at least one actuator to move the left and right support surfaces between the first and second positions only when a signal is received from the at least one sensor indicative of a passenger being present on the passenger seating portion.

12. The vehicle of claim 6, further comprising left and right driver side supports disposed laterally outwardly of the at driver seating portion.

13. The vehicle of claim 12, further comprising a driver back rest disposed generally rearwardly of the driver seating portion and generally forwardly of the passenger seating portion, wherein the left and right driver side supports are connected to the vehicle via the driver back rest.

14. A method of supporting a rider on a vehicle, the vehicle having:
a frame;
an engine supported on the frame;
at least one propulsion device operatively connected to the engine to propel the vehicle;
a straddle-type seat disposed on the frame, the straddle-type seat having at least one seating portion;
a steering device disposed generally forwardly of the seat; and
left and right side supports disposed generally laterally of the at least one seating portion on opposite sides of a longitudinal centerline of the vehicle, the left and right side supports having respective left and right support surfaces facing generally laterally inwardly;
the method comprising:
receiving a signal indicative of a current lateral acceleration of the vehicle;
comparing a current lateral acceleration of the vehicle to a predetermined threshold lateral acceleration;
moving the left and right support surfaces generally in a direction of the current lateral acceleration of the vehicle from a first position to a second position in response to the current lateral acceleration of the vehicle being greater than a first predetermined lateral acceleration; and
moving the left and right support surfaces from the second position toward the first position in response to the current lateral acceleration of the vehicle being less than a second predetermined lateral acceleration.

15. The method of claim 14, wherein the second predetermined lateral acceleration is approximately equal in magnitude to the first predetermined lateral acceleration.

16. The method of claim 14, wherein:
the at least one seating position comprises a driver seating position and a passenger seating position; and
the left and right side supports are disposed laterally of the passenger seating portion,
the method further comprising:
receiving a signal indicative of a passenger being seated on the passenger seating position.

17. A vehicle comprising:
a frame;
an engine supported on the frame;
at least one propulsion device operatively connected to the engine to propel the vehicle;
a straddle-type seat disposed on the frame, the straddle-type seat having at least one seating portion;
a steering device disposed generally forwardly of the seat; and
left and right side supports disposed generally laterally of the at least one seating portion on opposite sides of a longitudinal centerline of the vehicle, the left and right side supports having respective left and right support surfaces facing generally laterally inwardly,
the left support surface moving generally in a direction of a longitudinal centerline of the vehicle when a force is exerted on the left support surface generally in a direction generally opposite a current lateral acceleration of the vehicle; and
the right support surface moving generally in a direction of a longitudinal centerline of the vehicle when a force is exerted on the right support surface generally in a direction generally opposite the current lateral acceleration of the vehicle.

18. A vehicle comprising:
a frame;
an engine supported on the frame;
at least one propulsion device operatively connected to the engine to propel the vehicle;
a straddle-type seat disposed on the frame, the straddle-type seat having at least one seating portion;
a steering device disposed generally forwardly of the seat; and
left and right side supports disposed laterally outwardly of the at least one seating portion, the left and right side supports having respective left and right support surfaces facing generally laterally inwardly,
the left and right support surfaces moving generally in a first lateral direction from a first position toward a second position when the steering device is rotated in the first lateral direction, and
the left and right support surfaces moving from the second position toward the first position when the steering device is rotated in a second lateral direction opposite the first lateral direction.

19. The vehicle of claim 18, further comprising a mechanical linkage operatively connecting the steering device to the left and right side supports, wherein a rotation of the steering device in the first lateral direction actuates the left and right support surfaces via the mechanical linkage to move the left and right support surfaces in the first lateral direction.

20. The vehicle of claim 19, wherein the mechanical linkage includes at least one cable.

21. The vehicle of claim 20, wherein the at least one cable is at least one push-pull cable.

22. The vehicle of claim 18, wherein:
the steering device is connected to the left and right support surfaces via at least one hydraulic actuator;
a rotation of the steering device in the first lateral direction actuates the left and right support surfaces via the hydraulic actuator to move the left and right support surfaces in the first lateral direction; and
a rotation of the steering device in the second lateral direction actuates the left and right support surfaces via the hydraulic actuator to move the left and right support surfaces toward the first position.

23. A method of supporting a rider on a vehicle, the vehicle having:
   a frame;
   an engine supported on the frame;
   at least one propulsion device operatively connected to the engine to propel the vehicle;
   a straddle-type seat disposed on the frame, the straddle-type seat having at least one seating portion;
   a steering device disposed generally forwardly of the seat; and
   left and right side supports disposed generally laterally of the at least one seating portion on opposite sides of a longitudinal centerline of the vehicle, the left and right side supports having respective left and right support surfaces facing generally laterally inwardly;
   the method comprising:
      receiving a signal indicative of a current degree of rotation of the steering device in a first direction;
      comparing a current degree of rotation of the steering device to a predetermined degree of rotation of the steering device;
      moving the left and right support surfaces generally in the first direction in response to the current degree of rotation of the steering device being greater than a first predetermined degree of rotation of the steering device; and
      moving the left and right support surfaces from the second position toward the first position in response to the current degree of rotation of the steering device being less than a second predetermined degree of rotation of the steering device.

24. A method of supporting a rider on a vehicle, the vehicle having:
   a frame;
   an engine supported on the frame;
   at least one propulsion device operatively connected to the engine to propel the vehicle;
   a straddle-type seat disposed on the frame, the straddle-type seat having at least one seating portion;
   a steering device disposed generally forwardly of the seat; and
   left and right side supports disposed generally laterally of the at least one seating portion on opposite sides of a longitudinal centerline of the vehicle, the left and right side supports having respective left and right support surfaces facing generally laterally inwardly;
   the method comprising:
      moving the left and right support surfaces laterally outwardly in response to a current speed of the vehicle to the right being less than a predetermined speed; and
      moving the left and right support surfaces laterally inwardly in response to a current speed of the vehicle being greater than the predetermined speed.

25. The method of claim 24, wherein the predetermined speed is zero.

* * * * *